UNITED STATES PATENT OFFICE.

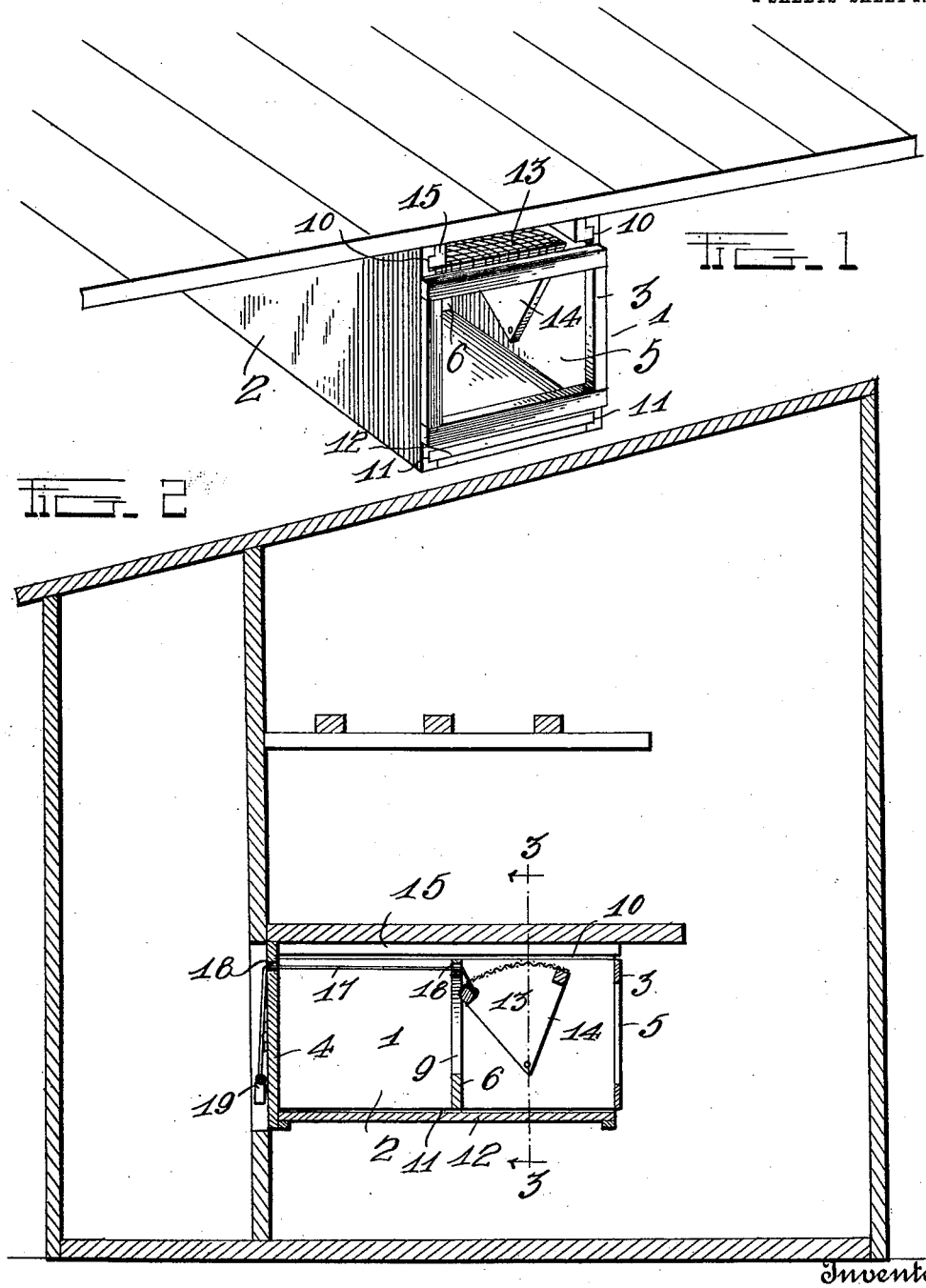

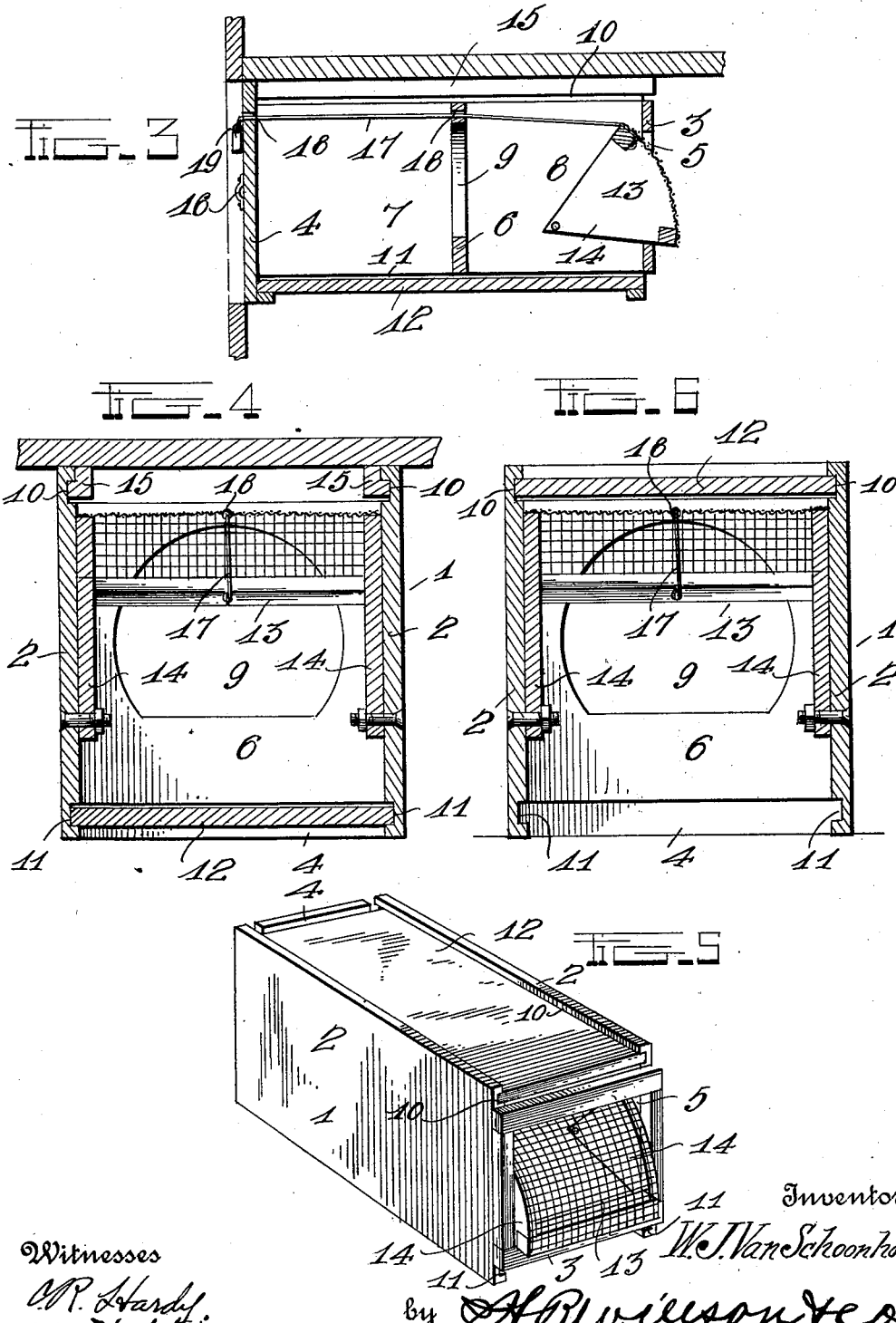

WILLIAM JAMES VAN SCHOONHOVEN, OF RASPEBURG, MARYLAND.

TRAP-NEST.

999,920. Specification of Letters Patent. Patented Aug. 8, 1911.

Application filed January 12, 1911. Serial No. 602,256.

*To all whom it may concern:*

Be it known that I, WILLIAM JAMES VAN SCHOONHOVEN, a citizen of the United States, residing at Raspeburg, in the county of Baltimore and State of Maryland, have invented certain new and useful Improvements in Trap-Nests; and I do declare the following to be a full, clear, and exact description of the invention, such as will enable others skilled in the art to which it appertains to make and use the same.

This invention relates to improvements in trap nests.

One object of the invention is to provide a trap nest having an improved construction and arrangement of trapping mechanism adapted to be automatically operated by a fowl on entering the nest.

Another object is to provide a trap nest which may be placed on the ground or other support or suspended from beneath the dropping board or a shelf, and which for this purpose is provided with a closing board adapted to be slidably engaged with the upper or lower side of the nest to form either the top or bottom, according to the position in which the nest is placed.

With these and other objects in view, the invention consists of certain novel features of construction, combination and arrangement of parts as will be more fully described and particularly pointed out in the appended claim.

In the accompanying drawings: Figure 1 is a perspective view showing the nest applied to a support beneath the dropping board; Fig. 2 is a vertical longitudinal section of the same and a portion of a poultry house showing the dropping mechanism in an open position; Fig. 3 is a similar view of the nest showing the dropping mechanism in a closed position; Fig. 4 is a vertical cross section of the nest on the line 3—3 of Fig. 2; Fig. 5 is a perspective view of the nest as arranged in place on the ground or similar support; Fig. 6 is a cross sectional view of the same.

In the embodiment of the invention I provide a box 1, which is preferably of oblong shape and of sufficient length to provide a nest compartment and an entrance way. The box comprises side pieces 2, and front and rear end pieces 3 and 4. The front end piece 3 is provided with an opening 5 through which the fowl may enter and leave the nest. Substantially midway between the front and rear ends of the box is arranged a partition 6, whereby the box is divided into a nest compartment 7 and an entrance way 8. In the partition is formed an opening 9 through which the fowl may pass to and from the nest compartment.

In the inner surfaces of the sides 2 of the box adjacent to their upper edges, are formed longitudinally disposed grooves or channels 10, while in such inner surfaces near the lower edges of the sides are formed longitudinally disposed guide grooves 11. Adapted to be slidably engaged with the grooves 10 at the top of the box, or with the grooves 11 at the bottom thereof, is a closing board 12, said board when engaged with the upper grooves 10 forming the top of the box, and when engaged with the grooves 11 forming the bottom of the box. The board 12 is engaged with the grooves 11 to form the bottom of the box when the latter is supported beneath the dropping board or other form of shelf, as shown in Figs. 1, 2, 3 and 4 of the drawings. When the nest or box is arranged on the ground or on a similar support, the latter forms the bottom of the box, and in this case the board 12 will be applied to the grooves 10 and thus form the top of the box or nest.

In the entrance way 8 of the nest is arranged my improved trapping mechanism, comprising a segmental door 13, having a wire netting covering and having substantially triangular end pieces 14, which are pivotally connected at their inner ends to the inner sides of the box in such position that when the door is swung forwardly the same will close the opening 5 in the front end of the box. When the door is swung upwardly and rearwardly the rear upper edge of the same will engage the front side of the partition 6 in such manner that the edge of the door will be disposed across the opening 9 in the partition, thereby partly closing said opening so that when the fowl attempts to pass through the opening from the entrance way to the nest the back of the fowl will come into engagement with the edge of the door, thus swinging the latter a sufficient distance to cause the door to overbalance on its pivotal supports and continue to swing to a closed position across the opening 5 in the end of the box, thus securely fastening the fowl in the box. It will be understood that the door when in an open position is overbalanced against the partition to a very slight extent so that very little pressure is required on the part of the fowl to overbalance and swing the door in the opposite direction or to a closed position.

When the nest is supported from the dropping board the latter is provided on its under side with a pair of rabbeted supporting cleats 15, with which the box is slidably engaged and is adapted to be operated as a drawer and pulled out rearwardly from beneath the dropping board into the passage way or space usually provided in the rear and the perches of the poultry house, thus permitting the eggs to be readily removed from the inner end or rear of the nest. To facilitate the rearward movement or opening of the trap when thus separated, the rear end of the trap is preferably provided with a suitable handle 16. In order to readily open the door for the purpose of releasing the fowl from the nest, I preferably provide a door operating cord 17, which passes through guide openings 18 in the rear end of the partition of the box, and is connected to the upper rear end of the door, as shown. The outer end of the cord is provided with a suitable weight 19, said weight being heavy enough to keep the cord taut and hanging down across the rear end of the box when the door is open. The position of the weighted end of the cord will thus indicate the position of the door, as when the latter is closed the cord will be pulled forwardly and the weight drawn to the upper portion of the box, thus indicating that a fowl has entered the nest.

By means of a trap nest constructed as shown and described, the poultryman may readily ascertain which of his fowls are laying, and will be enabled to keep the eggs of certain fowls separate from the eggs of other fowls.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

Having thus described my invention, what I claim is:

In combination with a support and parallel arranged cleats thereof, a trap nest having inner longitudinally disposed grooves for sliding engagement with said cleats, a sliding bottom for said nest and adapted to be likewise received by said longitudinal grooves when the nest is removed from the support, a pivotally mounted door located in the entrance of the nest and means for balancing said door and indicating the position thereof.

In testimony whereof I have hereunto set my hand in presence of two subscribing witnesses.

WILLIAM JAMES VAN SCHOONHOVEN.

Witnesses:
LEONARD ALBERT WEILLER,
SAMUEL J. FISHER.

---

Copies of this patent may be obtained for five cents each, by addressing the "Commissioner of Patents, Washington, D. C."